June 5, 1934.   C. M. WALTON   1,962,045
PENDULUM LEVEL
Filed Feb. 23, 1932   2 Sheets-Sheet 1
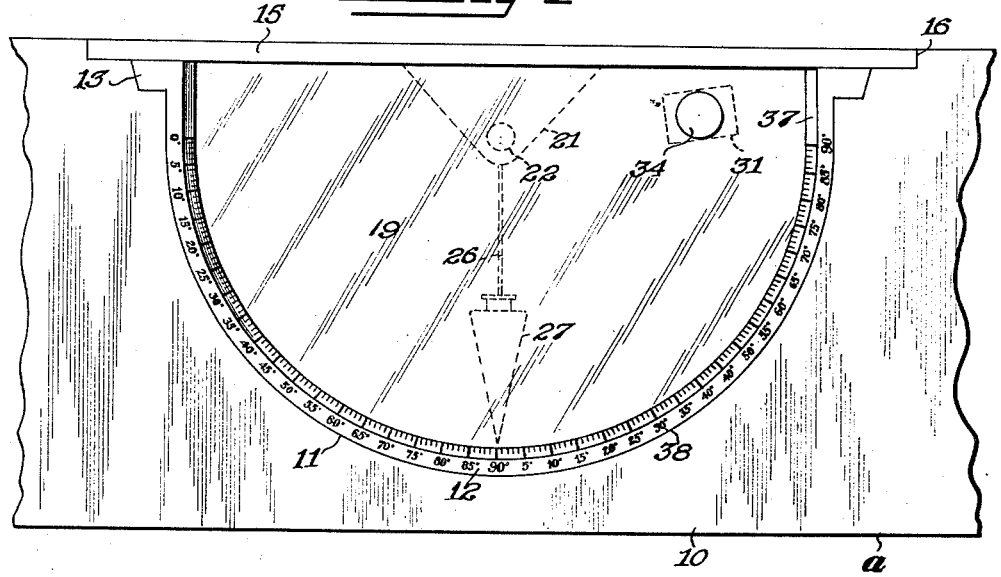
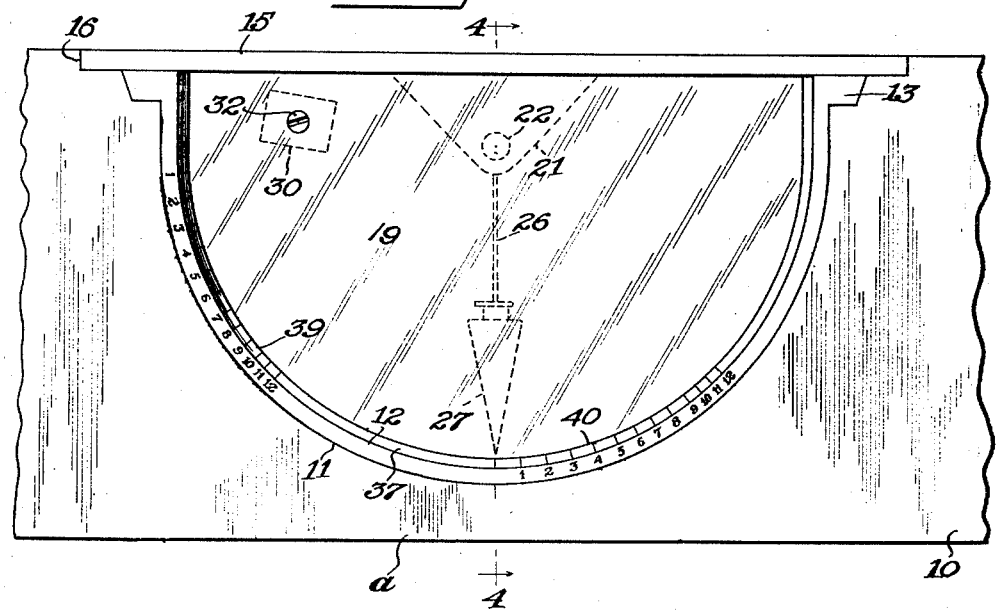
Charles M. Walton
INVENTOR
BY Victor J. Evans and Co.
ATTORNEY
WITNESS: H. P. Meader June 5, 1934.  C. M. WALTON  1,962,045
PENDULUM LEVEL
Filed Feb. 23, 1932   2 Sheets-Sheet 2
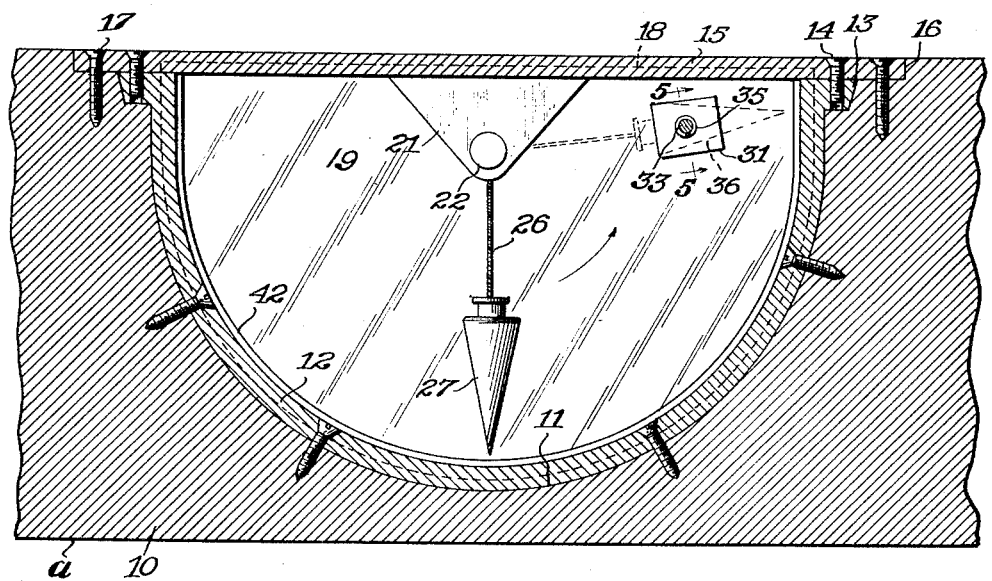
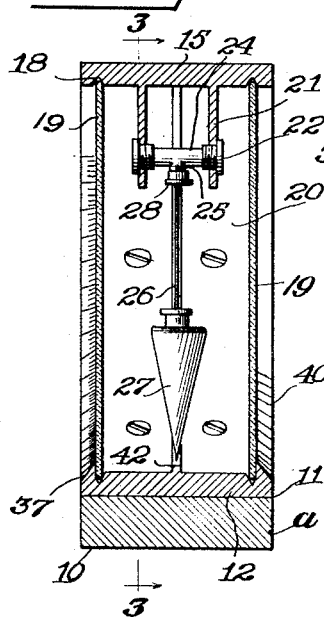
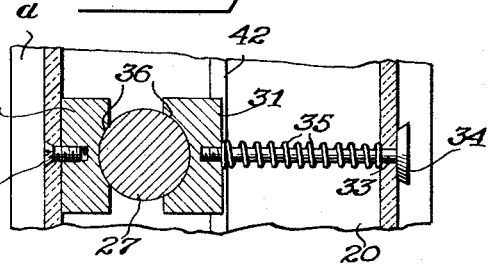
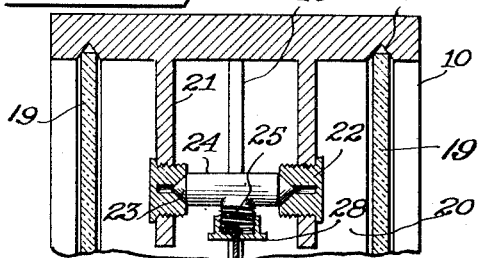
Charles M. Walton
INVENTOR
BY Victor J. Evans and Co.
ATTORNEY
WITNESS: H. P. Meader Patented June 5, 1934

1,962,045

UNITED STATES PATENT OFFICE 1,962,045

PENDULUM LEVEL

Charles M. Walton, Baton Rouge, La.

Application February 23, 1932, Serial No. 594,671

2 Claims. (Cl. 33—221)

The invention relates to a plumb-level and calculator and more especially to gravity levels and plumbs.

The primary object of the invention is the provision of an instrument of this character wherein work can be accurately set up and calculations obtained as to the rise of an inclination or bevel with dispatch and without the use of separate or independent measuring devices.

Another object of the invention is the provision of an instrument of this character wherein the construction thereof is such that testing of work may be had both vertically and horizontally and also certain inclinations or rises thereof, for example, bevels, and the accuracy thereof assured.

A further object of the invention is the provision of an instrument of this character wherein the gravity or plumb bob can be held immovable when the instrument is utilized for laying off straight line work either vertically or horizontally, the instrument being of novel construction and is readily portable.

A still further object of the invention is the provision of an instrument of this character which is extremely simple in its construction, thoroughly reliable and efficient in its purposes, possessing but few parts, these being associated and arranged in a novel manner, strong, durable, and inexpensive to manufacture.

With the above and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a fragmentary side elevation of an instrument constructed in accordance with the invention.

Figure 2 is a similar view looking toward the opposite side of said instrument.

Figure 3 is a vertical longitudinal sectional view taken approximately on the line 3—3 of Figure 4 looking in the direction of the arrows.

Figure 4 is a vertical transverse sectional view taken at the transverse median of said instrument.

Figure 5 is an enlarged fragmentary sectional view taken on the line 5—5 of Figure 3 looking in the direction of the arrows.

Figure 6 is a fragmentary vertical transverse sectional view on an enlarged scale showing the suspension of the plumb bob.

Similar reference characters indicate corresponding parts throughout the several views in the drawings.

Referring to the drawings in detail, the instrument comprises preferably in its construction a beam A, in this instance desirably made from wood constituting the stock 10, although it may be made from any other suitable material and such beam can be of any desirable length and thickness as well as width, while formed desirably at an intermediate point of its extent is a semi-circular recess 11, the later having its arch formation inwardly of the stock and opening through the uppermost longitudinal edge thereof.

Located within this recess 11 is a semi-circular frame 12, the latter being correspondingly sized with respect to the recess 11 to snugly fit therein and register therewith, the frame at its ends being provided with outturned lateral ears 13 for accommodating fasteners 14 passed through a flat bridge plate 15 and fastening it in place. The bridge plate 15 is countersunk or inset as at 16 in the top longitudinal edge of the stock 10 so that the outer face of this plate and the face of the said edge will be flush with each other. The ends of the plate 15 have passed therethrough screws 17 which engage into the stock A and thus firmly fasten the plate to the stock.

Formed in the frame 12 interiorly thereof and in the under face of the plate 15 are aligning V-shaped channels or grooves 18, these being preferably inset or disposed inwardly from the marginal sides of said frame and plate and seated therein are glass cover plates or panels 19 so as to provide a chamber 20 within the frame and waterproof.

Formed centrally at the under face of the plate 15 are spaced substantially V-shaped hangers 21 having adjustably fitted therein screw plug-like bearings 22 disposed opposite each other and receiving the pointed ends 23 of a rotatable shaft 24, the latter centrally thereof formed with an externally threaded stud 25 at right angles thereto and detachably engageable with the latter is a cap 28 having fixed centrally therein one end of a plumb bob suspension cable or cord 26 carrying the plumb bob 27 which is adapted for arcuate swinging movement within the chamber 20 and operates by gravity.

Arranged at one extremity of the paths of movement of the bob 27 within the chamber 20 is a bob clamp including the stationary and movable gripping blocks 30 and 31 respectively. The stationary block 30 is secured at 32 to one cover or panel 19, while the other block 31 is carried upon a stem 33 slidably fitted in the other cover or panel 19. The blocks 30 and 31 are directly opposite each other and the stem 33 at the end outside of the chamber 20 carries a knob or head 34 for manual manipulation. The stem is surrounded by a coiled expansion spring 35 which urges or forces the movable block 31 towards the stationary block 30. These blocks in their confronting faces are formed with seats 36 shaped correspondingly to the bob 27 to accommodate the same and when the bob swings between the blocks 30 and 31 and the knob 34 is freed so that the spring 35 is active to cause the block 31 to approach the block 30 the said bob 27 will be clamped therebetween and in this manner held against gravitation or swinging movement.

The frame 12 is provided at opposite sides with beveled edgings 37, these constituting dial or scale faces, one being calibrated with degree graduations 38 ranging from zero to ninety degrees in the manner as shown in Figure 1 of the drawings, these graduations being confined to one quarter of a circle and are laid out from a transverse median of the stock 10 on opposite sides thereof. It is understood, of course, that the degree scale may be varied or altered to suit the requirements of the user of the instrument. The other side of the frame at the edge 37, as shown in Figure 2 of the drawings, has the angular graduations or scale calibrations 39 and 40, respectively, these being for the purpose of giving the number of inches rise per foot of run for the particlar angle indicated of a piece of work with relation to the base and the height of said work and such graduations or scale 39 may be convenient in the use of the level for plumb work, while the graduations or scale 40 will be convenient for the use of the level for leveling.

When the bob is freed for gravitation within the chamber 20 constituted by the frame 12, plates or panels 19 and plate 15 the clamping blocks 30 and 31 will be in approached relation to each other with the knob or head 34 resting against the plate or panel 19 adjacent thereto and when it is desired to clamp the bob 27 the head 34 is manually pulled upon to spread the movable block 31 from the block 30 so that the bob 27 can pass therebetween and be clamped thereto as heretofore explained. The bob 27 when released is free for gravitation so as to be suspended perpendicularly on angularly disposing the stock 10 or arranging the same level. To assure the determining of a true perpendicular disposition of the bob 27 within the chamber there is provided a centering rib 42, the latter being formed on the frame 12 at the inner face thereof. This rib 42 is parallel with the scale 38, thus when the bob 27 registers with the said rib 42 and the degree mark above mentioned then a true perpendicular disposition of the bob is had.

What is claimed is:—

1. An instrument of the character described comprising a beam having a semi-circular recess opening through one edge, a frame fitted within the recess and having scale edgings, a bridge plate connected with the frame and countersunk in the beam at its edge through which the semi-circular recess opens, a gravity bob suspended midway of the bridge plate and movable about the frame, transparent panels seated in the frame and located at opposite sides of the beam, a pivoted journal for said bob, adjustable bearings connected with said bridge plate and receiving the journal, an externally threaded stud centrally on the journal, and a cap threaded on the stud and coupling therewith a suspension element for said bob.

2. An instrument of the character described comprising a beam having a semi-circular recess opening through one edge, a frame fitted within the recess and having scale edgings, a bridge plate connected with the frame and countersunk in the beam at its edge through which the semi-circular recess opens, a gravity bob suspended midway of the bridge plate and movable about the frame, transparent panels seated in the frame and located at opposite sides of the beam, blocks arranged between the panels in the path of movement of the bob, means stationarily securing one block on one panel, a stem slidably fitted in the other panel and carrying the other block, a finger piece on the outer end of the stem and manually actuated, and a spring surrounding the stem and active against the block carried thereby to urge the same toward the stationary block for the clamping of the bob between said blocks.

CHARLES M. WALTON.